(12) United States Patent
Ohtake

(10) Patent No.: US 9,331,584 B2
(45) Date of Patent: May 3, 2016

(54) SWITCHING POWER-SUPPLY DEVICE

(71) Applicant: Sanken Electric Co., LTD., Niiza-shi, Saitama (JP)

(72) Inventor: Osamu Ohtake, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 11 days.

(21) Appl. No.: 14/318,755

(22) Filed: Jun. 30, 2014

(65) Prior Publication Data

US 2015/0381055 A1    Dec. 31, 2015

(51) Int. Cl.
*H02M 3/335* (2006.01)
*H02M 1/00* (2006.01)

(52) U.S. Cl.
CPC ...... *H02M 3/33507* (2013.01); *H02M 3/33569* (2013.01); *H02M 2001/0009* (2013.01)

(58) Field of Classification Search
CPC .................. H02M 2001/0009; H02M 3/33569
USPC ............................................ 363/21.02, 21.03
See application file for complete search history.

(56) References Cited

U.S. PATENT DOCUMENTS

| | | | | |
|---|---|---|---|---|
| 2010/0226050 A1* | 9/2010 | Koo | ..................... | H02M 3/3376 361/18 |
| 2012/0134705 A1* | 5/2012 | Fukutani | ........... | H02M 3/33569 399/88 |
| 2013/0308347 A1* | 11/2013 | Sato | ....................... | H02M 3/337 363/21.03 |
| 2014/0268907 A1* | 9/2014 | Cinagrossi | ............ | H02M 3/285 363/21.02 |
| 2014/0286056 A1* | 9/2014 | Yoon | .................. | H02M 3/33569 363/21.03 |
| 2014/0307483 A1* | 10/2014 | Sigamani | .......... | H02M 3/33546 363/21.02 |
| 2015/0124489 A1* | 5/2015 | Dai | ................... | H02M 3/33538 363/17 |

FOREIGN PATENT DOCUMENTS

JP         H09-308243 A      11/1997

* cited by examiner

*Primary Examiner* — Timothy J Dole
*Assistant Examiner* — Ishrat Jamali
(74) *Attorney, Agent, or Firm* — Banner & Witcoff, Ltd.

(57) ABSTRACT

A switching power-supply device which includes a control unit configured to perform a switching control; and a resonance current detection unit configured to detect the resonance current flowing through the series resonance circuit. When an absolute value level of the resonance current exceeds a second threshold greater than a first threshold, the control unit inverts the turn on-and-off state of the first switching element or the second switching element at the time when the absolute value level reaches a third threshold between the first threshold and the second threshold. When the absolute value level of the resonance current exceeds the first threshold and does not exceed the second threshold, the control unit inverts the turn on-and-off state of the first switching element or the second switching element at the time when the absolute value level reaches the first threshold.

3 Claims, 6 Drawing Sheets

THROUGH CURRENT

SWITCHING POWER-SUPPLY DEVICE

TECHNICAL FIELD

This disclosure relates to a switching power-supply device.

BACKGROUND ART

A power supply in electronic devices such as a television, a smart phone and a PC is required to supply a constant direct-current voltage in a stable manner. As such a power supply, a resonance-type switching power-supply device has been used.

The resonance-type switching power-supply device uses semiconductor elements such as MOSFET (metal-oxide-semiconductor field-effect transistor), IGBT (Insulated Gate Bipolar Transistor) and thyristor as a switching element and once converts the input DC voltage into AC voltage by the turn on-and-off of the switching element. The converted AC voltage is converted into a stable DC voltage sequentially through a transformer, a rectifier circuit and a smoothing circuit and then is outputted.

In such a switching power-supply device, the output voltage is stabilized by controlling a switching frequency of the switching element according to the output voltage. A control range of the switching frequency has a normal control range of a frequency range higher than a resonance frequency of a resonance circuit consisting of a capacitor and an inductor. In order to widen the control range of the output voltage as far as possible, there is a case where it is desired to cause a lower-limit frequency of the switching frequency to be close to the resonance frequency as far as possible. However, in this case, there is a possibility that a so-called off-resonance occurs if variation exists in the characteristics of the elements constituting a circuit. The so-called off-resonance means that the switching frequency is deviated from the normal range and becomes lower than the resonance frequency.

Therefore, in a switching power-supply device disclosed in Japanese Patent Laid-Open Publication H9-308243, the off-resonance is suppressed by performing a control to return the switching frequency to the normal control range when it is detected that the switching frequency is deviated from the normal control range.

SUMMARY

In an electronic device mounted with a switching power-supply device, there is a case where load on the output side sharply increases. In this case, resonance current sharply increases and the time up to zero from peak of the resonance current is also shortened. Therefore, regenerative current flows through a body diode of one-side switching element which is turned off when the time to turn off the switching element becomes longer. In this condition, when the other-side switching element is turned on, through-current flows through the switching element in the turn-off state. Accordingly, there is a possibility that the switching element is damaged by the through-current. The switching power-supply device disclosed in Japanese Patent Laid-Open Publication H9-308243 does not consider a time of the load variation condition.

This disclosure has been made in consideration of the above situations and is to provide a switching power-supply device which is capable of suppressing the off-resonance even when there is a large load variation and improving reliability by suppressing the damage of elements.

A switching power-supply device of this disclosure includes a transformer comprising a primary winding and a secondary winding magnetically coupled to the primary winding; a rectifying-and-smoothing circuit connected to the secondary winding; a series circuit of a first switching element and a second switching element, which are connected to both ends of a DC power supply; a series resonance circuit comprising a capacitor connected to one end of the second switching element and the primary winding connected to a portion between the capacitor and the other end of the second switching element; a control unit configured to perform a switching control in which the first switching element and the second switching element are alternately turned on-and-off with providing a dead time, in which the first switching element and the second switching element are turned off respectively; and a resonance current detection unit configured to detect the resonance current flowing through the series resonance circuit. When an absolute value level of the resonance current exceeds a second threshold greater than a first threshold, the control unit inverts the turn on-and-off state of the first switching element or the second switching element at the time when the absolute value level reaches a third threshold between the first threshold and the second threshold. When the absolute value level of the resonance current exceeds the first threshold and does not exceed the second threshold, the control unit inverts the turn on-and-off state of the first switching element or the second switching element at the time when the absolute value level reaches the first threshold.

According to this disclosure, it is possible to provide a switching power-supply device which is capable of suppressing the off-resonance even when there is a large load variation and improving reliability by suppressing the damage of elements.

BRIEF DESCRIPTIONS OF DRAWINGS

DETAILED DESCRIPTION

Hereinafter, an illustrative of this disclosure will be described with reference to the drawings.

Figure 1:
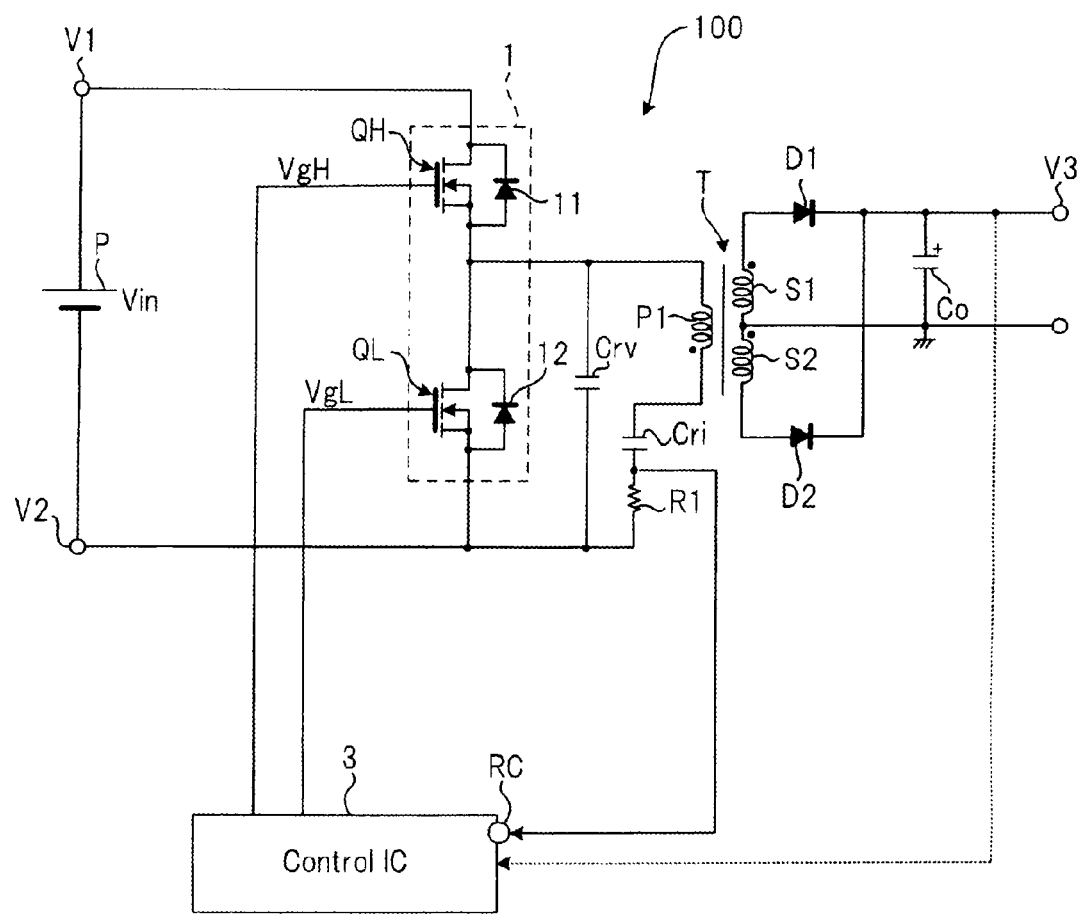
FIG. 1 is a view showing a schematic configuration of a switching power-supply device for explaining an illustrative embodiment of this disclosure.

FIG. 1 is a view showing a schematic configuration of a switching power-supply device 100 for explaining an illustrative embodiment of this disclosure.

The switching power-supply device 100 includes a terminal V1, which is connected to one end of a DC power supply P that supplies DC voltage Vin obtained by rectifying and smoothing AC voltage from a commercial power supply, for example, a terminal V2 which is connected to the other end (ground end) of the DC power supply P, a series circuit 1 which is connected to both ends of the DC power supply P, capacitors Cri, Crv, a transformer T, diodes D1, D2, a capacitor Co, a control unit (Control IC) 3 and a current detection resistor R1.

The series circuit 1 includes a switching element QH (MOSFET in the example of FIG. 1) configured by an on-off controllable semiconductor element such as MOSFET, IGBT and thyristor, a switching element QL (MOSFET in the example of FIG. 1) connected in series to the switching element QH, a diode 11 connected to both ends of the switching element QH, and a diode 12 connected to both ends of the switching element QL. The diode 11 may be a parasitic diode of the switching element QH and the diode 12 may be a parasitic diode of the switching element QL.

At both ends of the switching element QL in the series circuit 1, a circuit where a primary winding P1 of the transformer T, the capacitor Cri and the current detection resistor R1 are connected in series and the capacitor Crv are connected in parallel to each other. One end of the capacitor Crv and one end of the current detection resistor R1 are connected to one end of the switching element QL and the other end of the capacitor Crv and one end of the primary winding P1 are connected to the other end of the switching element QL.

The series circuit configured by the primary winding P1 of the transformer T and the capacitor Cri configures a series resonance circuit which is connected in parallel to the switching element QL.

The transformer T includes the primary winding P1 and secondary windings S1, S2 which are magnetically coupled to the primary winding P1.

One end (on the side of connection point with the secondary winding S2) of the secondary winding S1 is connected to a ground terminal, and the other end of the secondary winding S1 is connected to an anode of the diode D1. One end (on the side of connection point with the secondary winding S1) of the secondary winding S2 is connected to a ground terminal GND and the other end of the secondary winding S2 is connected to an anode of the diode D2. Cathodes of the diodes D1, D2 are connected to an output terminal V3.

The capacitor Co is connected to a portion between the output terminal V3 and the connection point of the secondary winding S1 and the secondary winding S2. The diodes D1, D2 are for rectifying the voltage generated in the secondary windings S1, S2. The capacitor Co is for smoothing the voltage generated in the secondary windings S1, S2. A rectifying-and-smoothing circuit is configured by the diodes D1, D2 and the capacitor Co and connected to the secondary windings S1, S2.

The current detection resistor R1 is connected to a portion between the capacitor Cri and the ground terminal V2. An input terminal RC of the control unit 3 is connected to a connection point between the capacitor Cri and the current detection resistor R1. According to the configuration, a voltage signal Icri corresponding to the resonance current flowing through the series resonance circuit is inputted to the control unit 3 from the input terminal RC.

A resonance current detection unit for detecting the resonance current flowing through the series resonance circuit is configured by the wires which are drawn from the current detection resistor R1 and the connection point between the current detection resistor R1 and the capacitor Cri.

Although not shown in FIG. 1, the switching power-supply device 100 includes a circuit for detecting the difference between a target voltage and an output voltage of the rectifying-and-smoothing circuit on the secondary side. A photocoupler is incorporated in the control unit 3 and transmits a signal corresponding to the difference to the control unit 3.

The control unit 3 performs a switching control in which the switching element QH and the switching element QL are alternately turned on-and-off with providing a dead time, in which the switching element QH and the switching element QL are turned off respectively. The control unit 3 generates gate control signals of the switching elements QH, QL and supplies these gate control signals to the switching elements QH, QL. The control unit 3 is controlled so that the output voltage is equal to the target voltage by changing the frequency of the gate control signal according to the signal from the secondary side.

Further, when an absolute value level of the voltage signal Icri corresponding to the resonance current inputted from the input terminal RC exceeds a second threshold greater than a first threshold, the control unit 3 inverts the turn on-and-off state of the switching element QH or the switching element QL at the time when the absolute value level reaches a third threshold between the first threshold and the second threshold. Furthermore, when the absolute value level of the resonance current exceeds the first threshold and does not exceed the second threshold, the control unit 3 inverts the turn on-and-off state of the switching element QH or the switching element QL at the time when the absolute value level reaches the first threshold. According to this control, it is possible to suppress the off-resonance, to suppress occurrence of the through-current and thus to protect the switching elements QH, QL even when there is a large load variation and thus the level of the resonance current increases.

Figure 2:
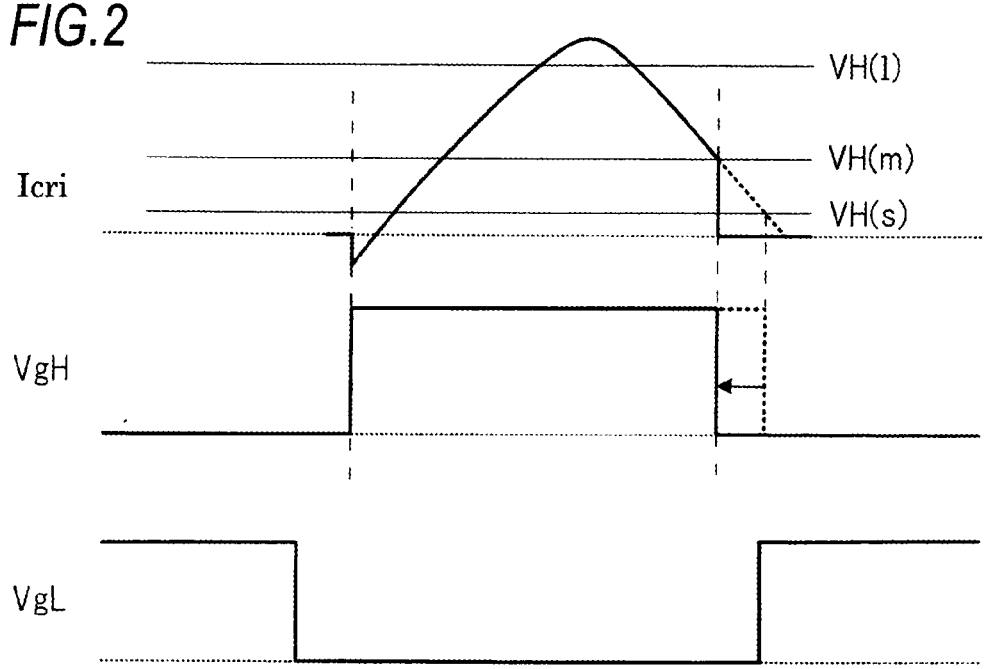
FIG. 2 is a view for specifically explaining the control contents in a case where the load variation of a control unit is large.
Figure 3:
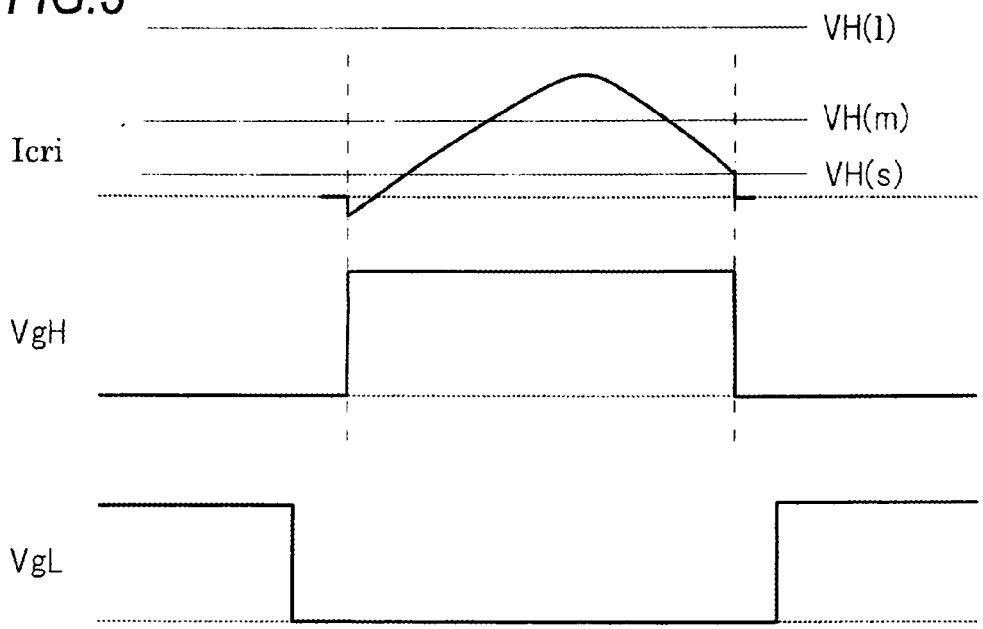
FIG. 3 is a view for specifically explaining the control contents in a case where the load variation of the control unit is small.

FIG. 2 and FIG. 3 are views for specifically explaining the control contents of the control unit 3. In FIG. 2 and FIG. 3, "VgH" indicates the gate control signal of the switching element QH, "VgL" indicates the gate control signal of the switching element QL and "Icri" indicates the voltage signal corresponding to the resonance current inputted to the input terminal RC.

As shown in FIG. 2, if the switching element QL is switched to an off state from an on state and, in this state, the switching element QH is turned on, the voltage signal Icri corresponding to the resonance current starts to rise toward the plus side. If there is a sharp load variation on the secondary side and the load becomes larger, the level of the voltage signal Icri exceeds a threshold VH(s) that is the first threshold and also exceeds a threshold VH(1) that is the second threshold, as shown in FIG. 2.

In such a state, the control unit 3 compares the level of the voltage signal Icri with a threshold VH(m) that is the third threshold and turns off the switching element QH at the time when the level of the voltage signal Icri reaches the threshold VH(m). After the switching element QH is turned off, a predetermined dead time is provided, and then the control unit 3 turns on the switching element QL.

On the other hand, the control unit 3 performs a control shown in FIG. 3 when the load variation is small. Namely, in a case where the level of the voltage signal Icri exceeds the threshold VH(s) and does not exceed the threshold VH(1), the control unit 3 compares the level of the voltage signal Icri with the threshold VH(s) and turns off the switching element QH at the time when the level of the voltage signal Icri reaches the threshold VH(s). After the switching element QH is turned off, a predetermined dead time is provided, and then the control unit 3 turns on the switching element QL.

FIG. 2 shows waveforms of signal by a dashed line when the switching element QH is turned off in a state where the level of the voltage signal Icri exceeds the threshold VH(1)

and reaches the threshold VH(s). When the switching element QH is turned off on the basis of the threshold VH(s) in a state where the level of the voltage signal Icri becomes larger, the switching period of the switching element QH becomes longer, as indicated by a dashed line in FIG. 2. As a result, the off-resonance may not be suppressed. Further, since the level of the voltage signal Icri sharply decreases from the peak when there is a large load variation, regenerative current flows through the diode 11 of the switching element QH in a case where the level of the voltage signal Icri is equal to the threshold VH(s) and then the switching element QH is turned off. Therefore, when the switching element QL is turned on in this state, through-current occurs.

According to the control indicated by a solid line in FIG. 2, it is possible to turn off the switching element QH at an early stage after the level of the voltage signal Icri reaches the peak. As a result, the off-resonance can be suppressed and occurrence of the regenerative current can be suppressed, so that it is possible to suppress the switching elements QH, QL from being damaged.

On the other hand, as shown in FIG. 3, the supply of power can be made without inadvertently reducing the switching period when the load variation is small. As described, current limit can be performed without an sharp over-current limit even when the load state is gradually shifted to an overload state from a static load state. Further, it is possible to maintain efficiency without increasing the switching loss.

Although FIG. 2 and FIG. 3 illustrate a case of controlling the turn-off timing of the switching element QH by the level of the resonance current when the switching element QH is turned on, the same is applied to an operation of controlling the turn-off timing of the switching element QL by the level of the resonance current when the switching element QL is turned on.

Specifically, the voltage signal Icri starts to fall in the minus direction when the switching element QL is turned on. In a case where the level of the voltage signal Icri falls below a threshold {−VH(1)}, the control unit 3 turns off the switching element QL at the time when the level of the voltage signal Icri reaches a threshold {−VH(m)}. Further, in a case where the level of the voltage signal Icri falls below a threshold {−VH(s)} and does not fall below the threshold {−VH(1)}, the control unit 3 turns off the switching element QL at the time when the level of the voltage signal Icri reaches the threshold {−VH(s)}.

Figure 4:
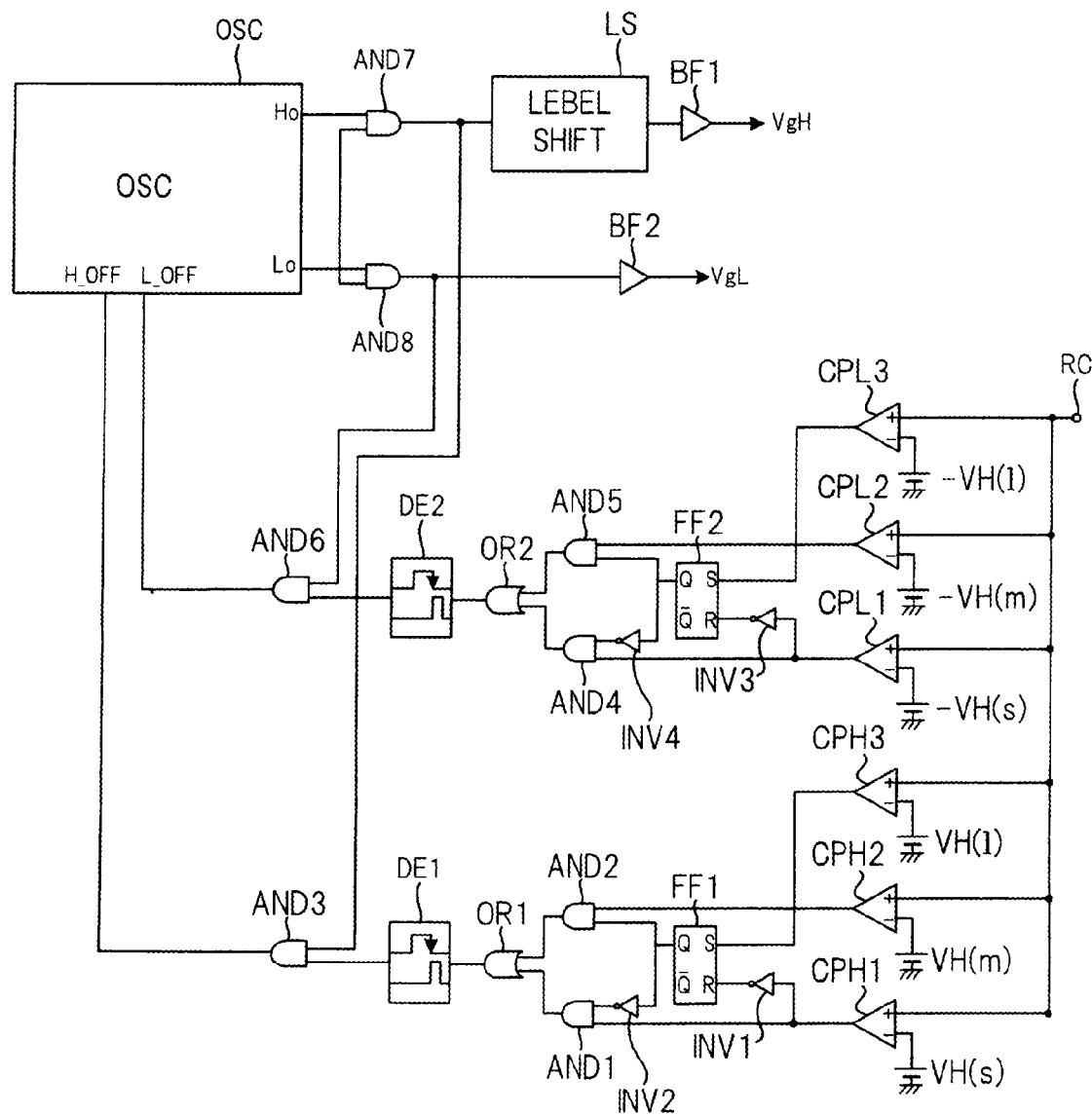
FIG. 4 is a view showing an example of a circuit configuration of the control unit shown in FIG. 1.

FIG. 4 is a view showing an example of a circuit configuration of the control unit 3 shown in FIG. 1.

The control unit 3 includes an oscillator OSC, a level shift circuit LS, buffers BF1, BF2, flip-flops FF1, FF2, inverters INV1 to INV4, AND circuits AND1 to AND8, OR circuits OR1, OR2, down edge detection circuits DE1, DE2, which detect the falling of output signals of the OR circuits OR1, OR2, comparators CPL1 to CPL3 and comparators CPH1 to CPH3.

A non-inverted input terminal of the comparator CPL1 is connected to the input terminal RC. An inverted input terminal of the comparator CPL1 is connected to a power supply that supplies voltage of the threshold {−VH(s)}.

A non-inverted input terminal of the comparator CPL2 is connected to the input terminal RC. An inverted input terminal of the comparator CPL2 is connected to a power supply that supplies voltage of the threshold {−VH(m)}.

A non-inverted input terminal of the comparator CPL3 is connected to the input terminal RC. An inverted input terminal of the comparator CPL3 is connected to a power supply that supplies voltage of the threshold {−VH(1)}.

An output terminal of the comparator CPL3 is connected to a set terminal of the flip-flop FF2. An output terminal of the comparator CPL1 is connected to a reset terminal of the flip-flop FF2 via the inverter INV3 and connected to an input terminal of the AND circuit AND4. An output terminal of the comparator CPL2 is connected to an input terminal of the AND circuit AND5.

A Q-terminal of the flip-flop FF2 is connected to the input terminal of the AND circuit AND5 and connected to an input terminal of the AND circuit AND4 via the inverter INV4.

Output terminals of the AND circuit AND4 and the AND circuit AND5 are connected to an input terminal of the OR circuit OR2. An output terminal of the OR circuit OR2 is connected to the down edge detection circuit DE2.

A non-inverted input terminal of the comparator CPH1 is connected to the input terminal RC. An inverted input terminal of the comparator CPH1 is connected to a power supply that supplies voltage of the threshold VH(s).

A non-inverted input terminal of the comparator CPH2 is connected to the input terminal RC. An inverted input terminal of the comparator CPH2 is connected to a power supply that supplies voltage of the threshold VH(m).

A non-inverted input terminal of the comparator CPH3 is connected to the input terminal RC. An inverted input terminal of the comparator CPH3 is connected to a power supply that supplies voltage of the threshold VH(1).

An output terminal of the comparator CPH3 is connected to a set terminal of the flip-flop FF1. An output terminal of the comparator CPH1 is connected to a reset terminal of the flip-flop FF1 via the inverter INV1 and connected to an input terminal of the AND circuit AND1. An output terminal of the comparator CPH2 is connected to an input terminal of the AND circuit AND2.

A Q-terminal of the flip-flop FF1 is connected to the input terminal of the AND circuit AND2 and connected to an input terminal of the AND circuit AND1 via the inverter INV2.

Output terminals of the AND circuit AND1 and the AND circuit AND2 are connected to an input terminal of the OR circuit OR1. An output terminal of the OR circuit OR1 is connected to the down edge detection circuit DE1.

An output terminal of the down edge detection circuit DE1 is connected to an input terminal of the AND circuit AND3 and an output terminal of the down edge detection circuit DE2 is connected to an input terminal of the AND circuit AND6.

An output terminal of the AND circuit AND3 and an output terminal of the AND circuit AND6 are respectively connected to an H_OFF terminal and an L_OFF terminal of the oscillator OSC. An output terminal Ho of the oscillator OSC is connected to the AND circuit AND7 and an output terminal Lo of the oscillator OSC is connected to the AND circuit AND8. One of the input terminals of the AND circuit AND7 and the AND circuit AND8 is common.

An output terminal of the AND circuit AND7 is connected to an input terminal of the AND circuit AND3 and connected to a gate terminal of the switching element QH via the level shift circuit LS and the buffer BF1. An output terminal of the AND circuit AND8 is connected to an input terminal of the AND circuit AND6 and connected to a gate terminal of the switching element QL via the buffer BF2.

An operation of the control unit 3 configured as described above will be described.

Figure 5:
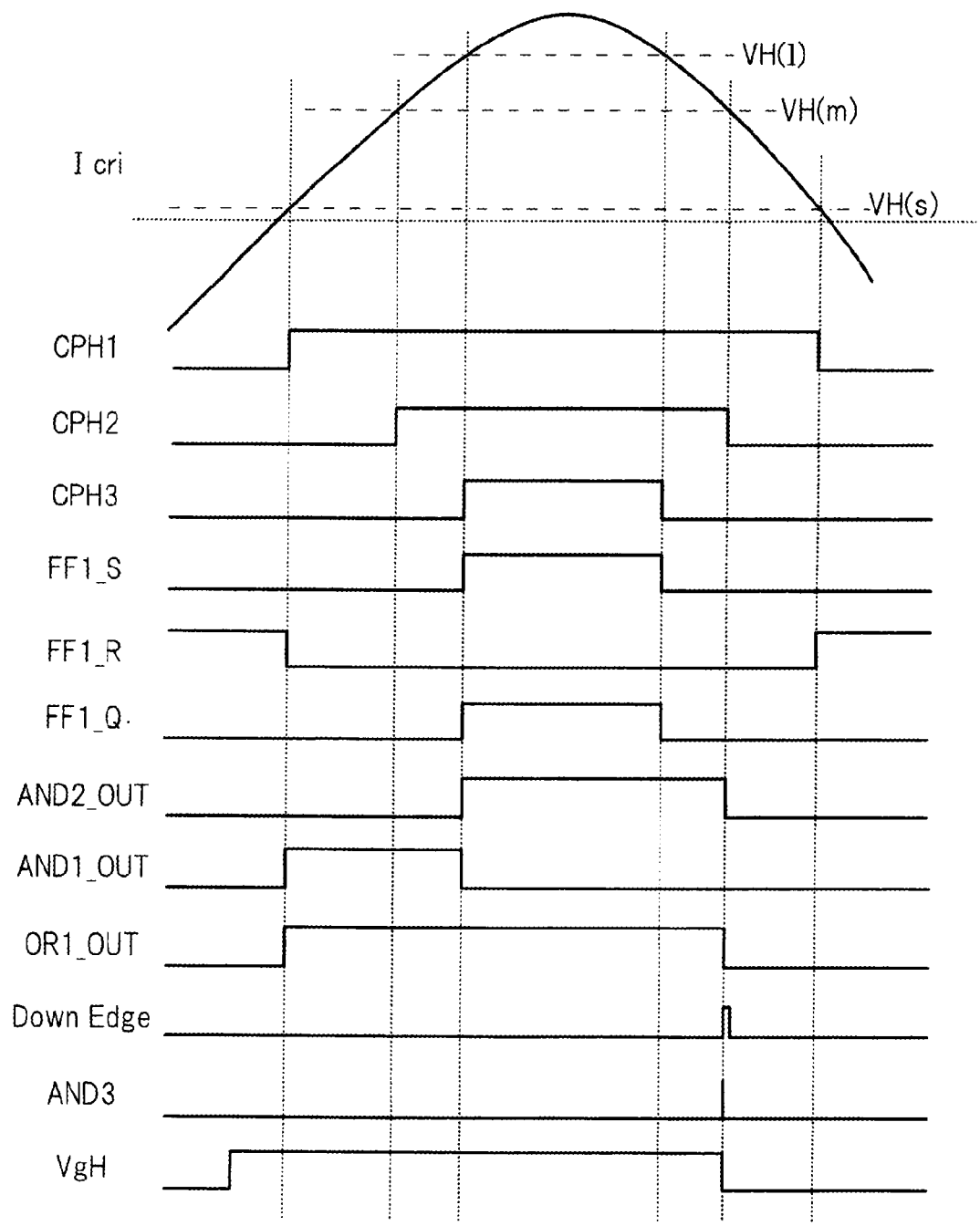
FIG. 5 is a timing chart for explaining an operation of the control unit.

FIG. 5 is a timing chart for explaining an operation of the control unit 3. In FIG. 5, "Icri" indicates a voltage signal inputted from the input terminal RC. "CPH1", "CPH2", "CPH3" indicate output signals of the comparators CPH1 to CPH3. "FF1_S" indicates an input signal of the set terminal of the flip-flop FF1. "FF1_R" indicates an input signal of the reset terminal of the flip-flop FF1. "FF1_Q" indicates an output signal of the Q-terminal of the flip-flop FF1. "AND2_OUT" indicates an output signal of the AND circuit AND2. "AND1_OUT" indicates an output signal of the AND circuit AND1. "OR1_OUT" indicates an output signal of the OR circuit OR1. "Down Edge" is an output signal of the down edge detection circuit DE1. "AND3" indicates an output signal of the AND circuit AND3. "VgH" indicates a signal that is outputted from the buffer BF1 and inputted to the gate terminal of the switching element QH.

When the voltage signal Icri reaches the threshold VH(s), the output of the OR circuit OR1 becomes a high level. Further, when the voltage signal Icri reaches the threshold VH(m), the output of the comparator CPH2 becomes a high level. When the voltage signal Icri further rises and reaches the threshold VH(1), the output of the comparator CPH3 becomes a high level but the output of the OR circuit OR1 is not changed.

Subsequently, when the voltage signal Icri decreases and reaches the threshold VH(m), the output of the comparator CPH2 becomes a low level. Accordingly, the output of the OR circuit OR1 becomes a low level and the output signal of the down edge detection circuit DE1 becomes a high level. When the output signal of the down edge detection circuit DE1 becomes a high level and therefore the output of the AND circuit AND3 becomes a high level, a signal for turning off the gate control signal VgH is inputted to the oscillator OSC. Then, the oscillator OSC inverts the signal outputted from the output terminal Ho, thereby turning off the gate control signal VgH.

Figure 6A:
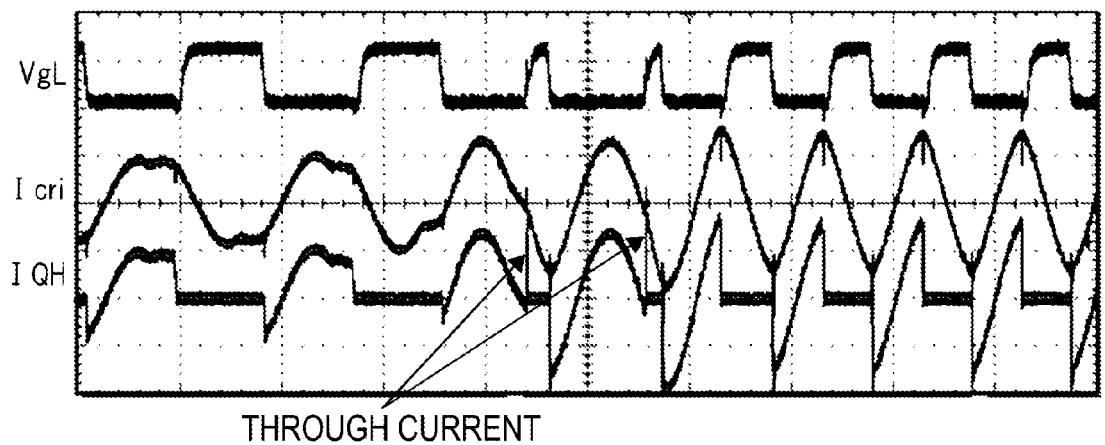
FIGS. 6A and 6B are views showing the signal waveforms during the operation of the control unit and the signal waveforms of a conventional device.
Figure 6B:
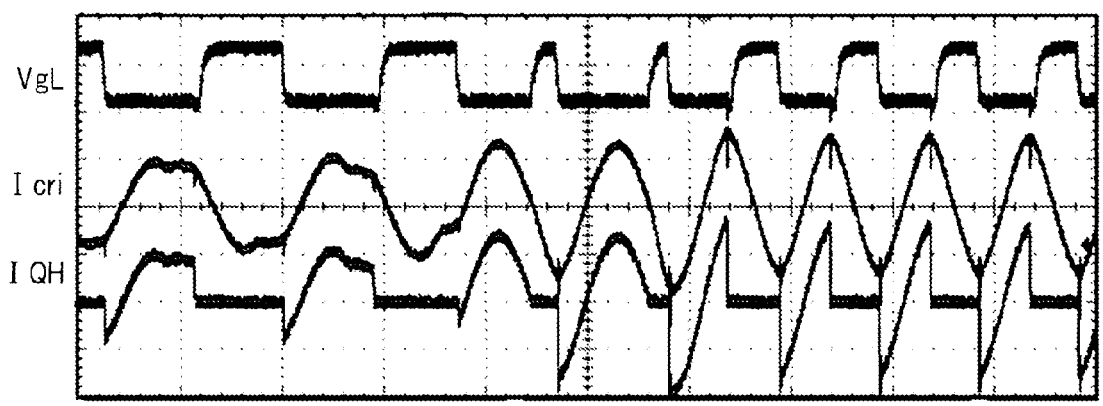

FIG. 6B is a view showing signal waveforms at the time of the operation of the control unit 3. FIG. 6A is a view showing operational waveforms when the switching element QH is turned off at the time when the voltage signal Icri exceeds the threshold VH(1) and reaches the threshold VH(s). In FIGS. 6A and 6B, "Icri" indicates a signal inputted to the input terminal RC, "VgL" indicates a signal outputted from the buffer BF2 and "IQH" indicates a signal corresponding to a drain current of the switching element QH.

As shown in FIGS. 6A and 6B, according to the switching power-supply device 100, the through-current occurring in FIG. 6A is suppressed and therefore it is possible to suppress the switching element QH from being damaged.

Hereinabove, an example has been described in which three kinds of thresholds including the threshold VH(s), the threshold VH(m) and the threshold VH(1) are set as the thresholds to be compared with the voltage signal Icri. As the thresholds to be compared with the voltage signal Icri, four or more kinds of thresholds may be set. Hereinafter, an example where four kinds of thresholds are set will be described.

Figure 7:
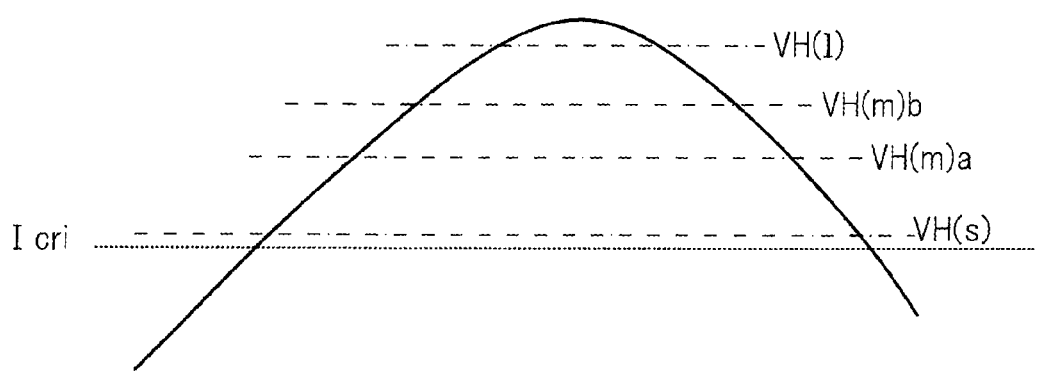
FIG. 7 is a view for explaining a modification of the operation of the switching power-supply device.

FIG. 7 shows an example where, as the thresholds to be compared with the voltage signal Icri, the threshold VH(s) and the threshold VH(1) are the same as those described above and the threshold VH(m) is changed to a threshold VH(m)a and a threshold VH(m)b, whose magnitudes are different from each other. Each of the threshold VH(m)a and the threshold VH(m)b is greater than the threshold VH(s) but smaller than the threshold VH(1). Further, the threshold VH(m)a is smaller than the threshold VH(m)b.

In the example of FIG. 7, in a case where the level of the voltage signal Icri exceeds the threshold VH(1), the control unit 3 turns off the switching element QH at the time when the level of the voltage signal Icri reaches the threshold VH(m)b.

Further, in a case where the level of the voltage signal Icri exceeds the threshold VH(m)b and does not exceed the threshold VH(1), the control unit 3 turns off the switching element QH at the time when the level of the voltage signal Icri reaches the threshold VH(m)a.

In a case where the level of the voltage signal Icri exceeds the threshold VH(s) and does not exceed the threshold VH(m)b, the control unit 3 turns off the switching element QH at the time when the level of the voltage signal Icri reaches the threshold VH(s).

In a case where the level of the voltage signal Icri exceeds the threshold VH(1), the threshold VH(1) functions as the second threshold, the threshold VH(m)b functions as the third threshold, and the threshold VH(s) functions as the first threshold. Further, in a case where the level of the voltage signal Icri exceeds the threshold VH(m)b and does not exceed the threshold VH(1), the threshold VH(m)b functions as the second threshold, the threshold VH(m)a functions as the third threshold, and the threshold VH(s) functions as the first threshold.

As described, the control unit 3 sets the third threshold to another value in accordance with the magnitude of the second threshold which the voltage signal Icri exceeds. In the example of FIG. 7, as the second threshold which the level of the voltage signal Icri exceeds becomes greater, the third threshold is set to a greater value. In this configuration, the greater the level of the voltage signal Icri is, the faster the descending speed of the voltage signal Icri is. Accordingly, it is preferable to turn off the switching element QH at an earlier timing from the viewpoint of suppressing the through-current.

Although the threshold VH(m)a and the threshold VH(m)b have been used in the above example, a threshold VH(m)c, a threshold VH(m)d or the like (not shown) may be additionally set. Setting it becomes capable of fine setting by setting a plurality of thresholds in this way.

According to the configuration, a flexible control can be made in accordance with the absolute value level of the resonance current. As a result, the off-resonance can be suppressed and the switching period can be optimized, so that it is possible to improve efficiency.

Figure 8:
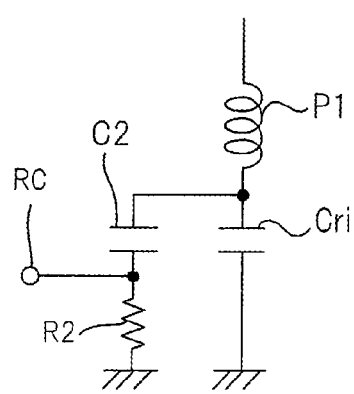
FIG. 8 is a view showing a modification of a resonance current detection unit in the switching power-supply device.

FIG. 8 is a view showing a modification of the resonance current detection unit in the switching power-supply device 100.

The resonance current detection unit shown in FIG. 8 includes a capacitor C2 and a resistor R2. One end of the capacitor C2 is connected to a connection point between the primary winding P1 and the capacitor Cri and the other end thereof is connected to the resistor R2. The input terminal RC is connected to a connection point between the capacitor C2 and the resistor R2. The resonance current may be detected by this configuration.

Hereinabove, this disclosure has been described with reference to the specific embodiments. However, the specific embodiments are just examples and it goes without saying that the specific embodiments can be modified and practiced without departing from the spirit of this disclosure.

As has been described above, the following matters are disclosed herein.

A switching power-supply device disclosed herein includes a transformer comprising a primary winding and a secondary winding magnetically coupled to the primary winding; a rectifying-and-smoothing circuit connected to the secondary winding; a series circuit of a first switching element and a second switching element, which are connected to both ends of a DC power supply; a series resonance circuit comprising a capacitor connected to one end of the second switching element and the primary winding connected to a portion between the capacitor and the other end of the second switching element; a control unit configured to perform a switching control in which the first switching element and the second switching element are alternately turned on-and-off with providing a dead time, in which the first switching element and the second switching element are turned off respectively; and a resonance current detection unit configured to detect the resonance current flowing through the series resonance circuit. When an absolute value level of the resonance current exceeds a second threshold greater than a first threshold, the control unit inverts the turn on-and-off state of the first switching element or the second switching element at the time when the absolute value level reaches a third threshold between the first threshold and the second threshold. When the absolute value level of the resonance current exceeds the first threshold and does not exceed the second threshold, the control unit inverts the turn on-and-off state of the first switching element or the second switching element at the time when the absolute value level reaches the first threshold.

In the switching power-supply device disclosed herein, a plurality of second thresholds is set and the control unit sets the third threshold to another value in accordance with the magnitude of the second thresholds which the absolute value level of the resonance current exceeds.

In the switching power-supply device disclosed herein, as the second threshold which the absolute value level of the resonance current exceeds becomes greater, the control unit sets the third threshold to a greater value.

The invention claimed is:

1. A switching power-supply device comprising:
   a transformer comprising a primary winding and a secondary winding magnetically coupled to the primary winding;
   a rectifying-and-smoothing circuit connected to the secondary winding;
   a series circuit of a first switching element and a second switching element, which are connected to both ends of a DC power supply;
   a series resonance circuit comprising: a capacitor connected to one end of the second switching element; and the primary winding connected to a portion between the capacitor and the other end of the second switching element;
   a control unit configured to perform a switching control in which the first switching element and the second switching element are alternately turned on-and-off with providing a dead time, in which the first switching element and the second switching element are turned off respectively; and
   a resonance current detection unit configured to detect a resonance current flowing through the series resonance circuit,
   wherein, in a case where an absolute value level of the resonance current exceeds a second threshold greater than a first threshold, the control unit inverts a turn on-and-off state of the first switching element or the second switching element at a time when the absolute value level reaches a third threshold between the first threshold and the second threshold, and
   wherein, in a case where the absolute value level of the resonance current exceeds the first threshold and does not exceed the second threshold, the control unit inverts the turn on-and-off state of the first switching element or the second switching element at a time when the absolute value level reaches the first threshold.

2. The switching power-supply device according to claim 1,
   wherein a plurality of second thresholds is set, and
   wherein the control unit sets the third threshold to another value in accordance with the magnitude of the one of the second thresholds which the absolute value level of the resonance current exceeds.

3. The switching power-supply device according to claim 2,
   wherein, as the one of the second thresholds which the absolute value level of the resonance current exceeds becomes greater, the control unit sets the third threshold to a greater value.

* * * * *